(12) United States Patent
Oh et al.

(10) Patent No.: US 10,720,989 B2
(45) Date of Patent: Jul. 21, 2020

(54) APPARATUS AND METHOD FOR TRANSMITTING AND RECEIVING SIGNAL IN COMMUNICATION SYSTEM

(71) Applicant: Samsung Electronics Co., Ltd, Gyeonggi-do (KR)

(72) Inventors: Jong-Ho Oh, Gyeonggi-do (KR); Jung-Min Yoon, Seoul (KR); Hyun-Kyu Yu, Seoul (KR); Sang-Hyun Chang, Seoul (KR); Kil-Sik Ha, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 15/237,619

(22) Filed: Aug. 15, 2016

(65) Prior Publication Data

US 2017/0047989 A1    Feb. 16, 2017

(30) Foreign Application Priority Data

Aug. 13, 2015 (KR) .................. 10-2015-0114615

(51) Int. Cl.
| | |
|---|---|
| *H04B 7/24* | (2006.01) |
| *H04L 29/08* | (2006.01) |
| *H04L 29/06* | (2006.01) |
| *H04L 12/26* | (2006.01) |

(52) U.S. Cl.
CPC .............. *H04B 7/24* (2013.01); *H04L 69/22* (2013.01); *H04L 69/323* (2013.01); *H04L 43/16* (2013.01)

(58) Field of Classification Search
CPC ........... H04B 7/24; H04L 43/16; H04L 69/22; H04L 69/323
See application file for complete search history.

(56) References Cited

U.S. PATENT DOCUMENTS

| | | | | |
|---|---|---|---|---|
| 7,020,116 | B1 * | 3/2006 | Nakada | H04L 27/2662 370/338 |
| 7,062,002 | B1 * | 6/2006 | Michel | H04B 1/7073 375/354 |
| 8,498,252 | B2 * | 7/2013 | Davydov | H04L 5/0023 370/210 |
| 10,194,388 | B2 * | 1/2019 | Rajagopal | H04W 52/0206 |
| 2001/0040884 | A1 * | 11/2001 | Bouquier | H04B 1/70735 370/350 |
| 2009/0097465 | A1 * | 4/2009 | Inoue | H04J 13/0077 370/342 |
| 2010/0291925 | A1 * | 11/2010 | Nagata | H04J 11/0069 455/434 |

(Continued)

*Primary Examiner* — Khaled M Kassim

(57) ABSTRACT

The present disclosure relates to a $5^{th}$-Generation (5G) or pre-5G communication system to be provided to support a higher data rate than a $4^{th}$-Generation (4G) communication system like Long Term Evolution (LTE). A method for transmitting a signal in a communication system according to an embodiment of the present disclosure includes generating a Golay sequence for a weight value in which a correlation peak value is less than a preset threshold value, configuring a Short Training Field (STF) including the generated Golay sequence, and transmitting a signal for a Physical layer convergence procedure Protocol Data Unit (PPDU) including the STF.

10 Claims, 13 Drawing Sheets

(56) References Cited

U.S. PATENT DOCUMENTS

| | | | |
|---|---|---|---|
| 2011/0207457 A1* | 8/2011 | Nagata | H04J 11/0069 455/434 |
| 2012/0113974 A1* | 5/2012 | Zhu | H04L 5/0048 370/344 |
| 2013/0090881 A1* | 4/2013 | Janardhanan | G01C 22/006 702/104 |
| 2013/0259013 A1* | 10/2013 | Malladi | H04W 56/00 370/336 |
| 2014/0003468 A1* | 1/2014 | Takeda | H04B 1/7073 375/135 |
| 2014/0204928 A1* | 7/2014 | Sorin | H04W 56/001 370/338 |
| 2014/0321479 A1 | 10/2014 | Zhang et al. | |
| 2015/0282068 A1* | 10/2015 | Rajagopal | H04W 52/0206 370/350 |
| 2016/0218890 A1* | 7/2016 | Sanderovich | H04L 25/03305 |
| 2016/0241314 A1* | 8/2016 | Ferrante | H04W 72/0406 |

\* cited by examiner

FIG.6

| $Gb^{(i)}_{128}$ | $Gb^{(i)}_{128}$ | $Gb^{(i)}_{128}$ | ⋯ | $Gb^{(i)}_{128}$ | $-Gb^{(i)}_{128}$ | $-Gb^{(i)}_{128}$ |

FIG.8A

| $Ga^{(i)}_{128}$ | $Ga^{(i)}_{128}$ | $Ga^{(i)}_{128}$ | ⋯ | $Ga^{(i)}_{128}$ | $Ga^{(i)}_{128}$ | $-Ga^{(i)}_{128}$ |

FIG.8B

| L-STF | L-CEF | L-Header | NG-STF | NG-CEF | NG-Header | Data |

FIG.9A

| NG-STF | NG-CEF | NG-Header | Data |

FIG.9B

| NG-STF | NG-CEF | C-Header | NG-STF | NG-CEF | C-Header | ... | NG-STF | NG-CEF | C-Header |

FIG.9C

APPARATUS AND METHOD FOR TRANSMITTING AND RECEIVING SIGNAL IN COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Aug. 13, 2015 and assigned Serial No. 10-2015-0114615, the entire disclosure of which is incorporated herein by reference.

TECHNICAL FIELD

The present disclosure relates to a method and apparatus for transmitting and receiving a signal based on characteristics of a Golay sequence in a communication system.

BACKGROUND

To satisfy demands for wireless data traffic having increased since commercialization of $4^{th}$-Generation (4G) communication systems, efforts have been made to develop improved $5^{th}$-Generation (5G) communication systems or pre-5G communication systems. For this reason, the 5G communication system or the pre-5G communication system is also called a beyond-4G-network communication system or a post-long term evolution (LTE) system.

To achieve a high data rate, implementation of the 5G communication system in an ultra-high frequency (mm Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud Radio Access Network (RAN), an ultra-dense network, a Device to Device (D2D) communication, a wireless backhaul, a moving network, cooperative communication, Coordinated Multi-Points (CoMPs), and interference cancellation have been developed.

In the 5G system, Advanced Coding Modulation (ACM) schemes including hybrid Frequency-Shift Keying (FSK) and Quadrature Amplitude Modulation (QAM) Modulation (FQAM) and Sliding Window Superposition Coding (SWSC), and advanced access schemes including Filter Bank Multi Carrier (FBMC), Non-Orthogonal Multiple Access (NOMA), and Sparse Code Multiple Access (SCMA) have been developed.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide an apparatus and method for transmitting and receiving a signal based on characteristics of a Golay sequence in a communication system.

The present disclosure also provides an apparatus and method for transmitting and receiving a signal by using a Golay sequence used in another transmission entity and a Golay sequence in which interference does not occur in a communication system.

According to an aspect of the present disclosure, there is provided a method for transmitting a signal in a communication system, the method including generating a Golay sequence for a weight value in which a correlation peak value is less than a preset threshold value, configuring a Short Training Field (STF) including the generated Golay sequence, and transmitting a signal for a Physical layer convergence procedure Protocol Data Unit (PPDU) including the STF.

According to another aspect of the present disclosure, there is provided a method for receiving a signal in a communication system, the method including receiving signals for a plurality of PPDUs, measuring, from an STF included in the plurality of PPDUs, a correlation for each of Golay sequences for a weight value in which a correlation peak value is less than a preset threshold value, and detecting a signal transmitted from a serving cell and a signal transmitted from a neighboring cell from among the received signals based on the measured correlations.

According to another aspect of the present disclosure, there is provided an apparatus for transmitting a signal in a communication system, the apparatus including a controller configured to generate a Golay sequence for a weight value in which a correlation peak value is less than a preset threshold value and to configure an STF including the generated Golay sequence and a transmitter configured to transmit a signal for a PPDU including the STF.

According to another aspect of the present disclosure, there is provided an apparatus for receiving a signal in a communication system, the apparatus including a receiver configured to receive signals for a plurality of PPDUs and a controller configured to measure, from a STF included in the plurality of PPDUs, a correlation for each of Golay sequences for a weight value in which a correlation peak value is less than a preset threshold value, and to detect a signal transmitted from a serving cell and a signal transmitted from a neighboring cell from among the received signals based on the measured correlations.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates a pair of $Ga_{128}(n)$ and $Gb_{128}(n)$, which is a pair of Golay sequences, to which the present disclosure is applied;

FIGS. 8A and 8B illustrate an example for configuring an STF in a transmission entity according to an embodiment of the present disclosure;

FIGS. 9A, 9B and 9C illustrate formats of a PPDU including an STF configured according to an embodiment of the present disclosure;

Throughout the drawings, like reference numerals will be understood to refer to like parts, components, and structures.

DETAILED DESCRIPTION

FIGS. 1 through 14, discussed below, and the various embodiments used to describe the principles of the present disclosure in this patent document are by way of illustration Only and should not be construed in any way to limit the scope of the disclosure. Those skilled in the art will understand that the principles of the present disclosure may be implemented in any suitably arranged wireless communication system.

Hereinafter, exemplary embodiments of the present disclosure will be described in detail with reference to the accompanying drawings. In the following description, only parts necessary for understanding of operations according to embodiments of the present disclosure will be described and other parts will not be described not to obscure the subject matter of the present disclosure.

With the recent development of communication systems, a need has existed to rapidly transmit various forms of digital information to desired users. As digital image media technologies have been developed and demands for ultra-high speed wireless transmission have increased in the communication systems, much research has been conducted on giga-bit-level wireless transmission, and the Institute of Electrical and Electronics Engineers (IEEE) 802.11ad communication standards using a 60 GHz band has attracted much attention. This is because the EE 802.11ad communication standards are capable of using a broad bandwidth of 7 GHz in spite of an Industrial. Scientific Medical (ISM) band.

Figure 1:
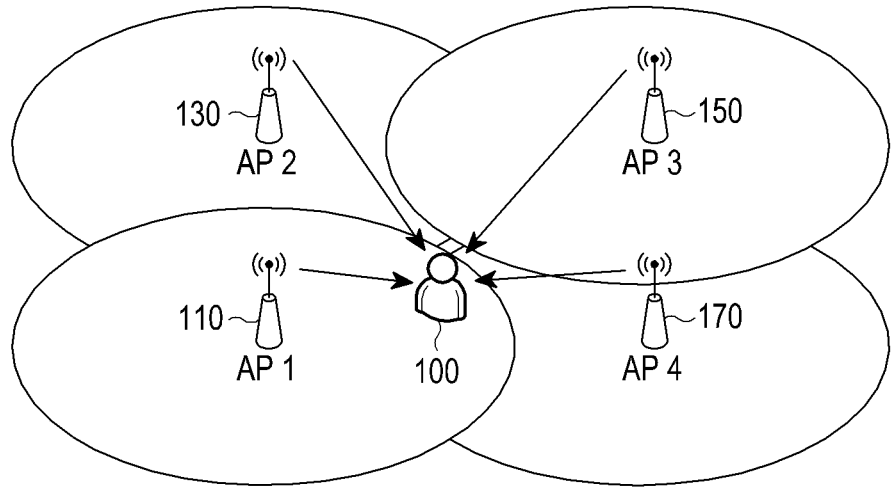
FIG. 1 is a block diagram of a communication system according to an embodiment of the present disclosure.

However, since a communication system using the IEEE 802.11ad communication standards use a broad bandwidth, one terminal may receive a plurality of signals from a plurality of Access Points (AP) as illustrated in FIG. 1.

FIG. 1 is a block diagram of a communication system to which according to an embodiment of the present disclosure is applied. Although it is assumed in FIG. 1 that a terminal 100 and first through fourth APs 110 through 170 exist in a communication system, an embodiment of the present disclosure is applicable in any communication system where at least two APs exist.

Referring to FIG. 1, the terminal 100 receives a serving signal from the first AP 110 included in a serving cell and receives an interference signal from each of the second AP 130 through the fourth AP 170 included in neighboring cells. Here, each of the first AP 110 through the fourth AP 170 can be included in a legacy communication system or a communication system using the IEEE 802.11ad communication standards.

Figure 2:
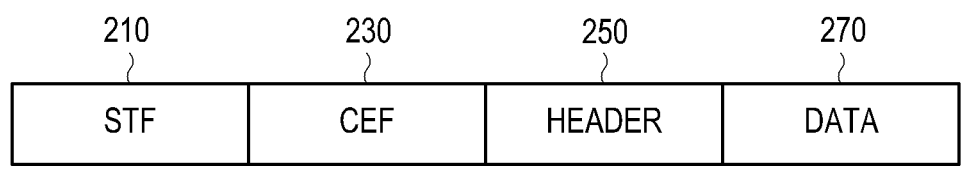
FIG. 2 illustrates a format of a Physical layer convergence Procedure Protocol Data Unit (PPDU) to which an embodiment of the present disclosure is applied.

Each of the first AP 110 through the fourth AP 170 transmits a signal including a Physical layer convergence Procedure Protocol Data Unit (PPDU) as illustrated in FIG. 2 to the terminal 100. Herein below, each of the first AP 110 through the fourth AP 170 is a device for transmitting a signal, and thus will be defined as a transmission entity. Herein below, the terminal 100 is a device for receiving a signal from each of the first AP 110 through the fourth AP 170, and thus will be defined as a reception entity.

FIG. 2 illustrates a format of a PPDU to which an embodiment of the present disclosure is applied.

Referring to FIG. 2, a PPDU in which a signal is transmitted and received includes a Short Training Field (STF) 210, a Channel Estimation Field (CEF) 230, a header field 250, and a data field 270.

Each of the fields 210 through 270 included in the PPDU includes "1" and "−1".

The STF 210 includes a Golay sequence, and is used to perform Automatic Gain Control (AGC), PPDU detection, and auto detection by a reception entity. The STF 210 is also used to perform timing synchronization for synchronizing a timing error occurring when a signal passes through a channel during transmission from a transmission entity to a reception entity and carrier frequency offset estimation.

The CEF field 230 is used to perform channel estimation. Signal to Noise Ratio (SNR) estimation, precise timing synchronization, and auto detection.

Once the transmission entity transmits the signal including the PPDU configured as described above to the reception entity, the reception entity can efficiently perform subsequent processes only after detecting the PPDU without error from the received signal. A process for detecting the PPDU in the reception entity can use auto-correlation of the Golay sequence provided in the STF 210 of the PPDU included in the received signal.

However, as described above with reference to FIG. 1, when receiving a plurality of signals at the same time, the reception entity may iteratively receive an STF (hereinafter, a first STF) of a PPDU included in a signal transmitted from a transmission entity existing in a serving cell an STF (hereinafter, a second STF) of a PPDU included in a signal transmitted from a transmission entity existing in a neighboring cell. In tins case, the reception entity may fail to process the second STF as normal noise signal. The second STF then acts as an interference signal of the first STF, resulting in degradation of the performance of STF-based timing synchronizing by the reception entity. Thus, the reception entity may not accurately detect the PPDU included in the signal transmitted from the transmission entity existing in the serving cell. For example, FIGS. 3 and 4 show a probability of detecting a PPDU and a probability of missing a PPDU with respect to a sensitivity of the signal received by the reception entity.

FIGS. 3A, 3B, 4A and 4B show a probability of detecting a PPDU and a probability of missing a PPDU with respect to a sensitivity of a signal received by a reception entity of a communication system to which the present disclosure is applied.

Figure 3A:
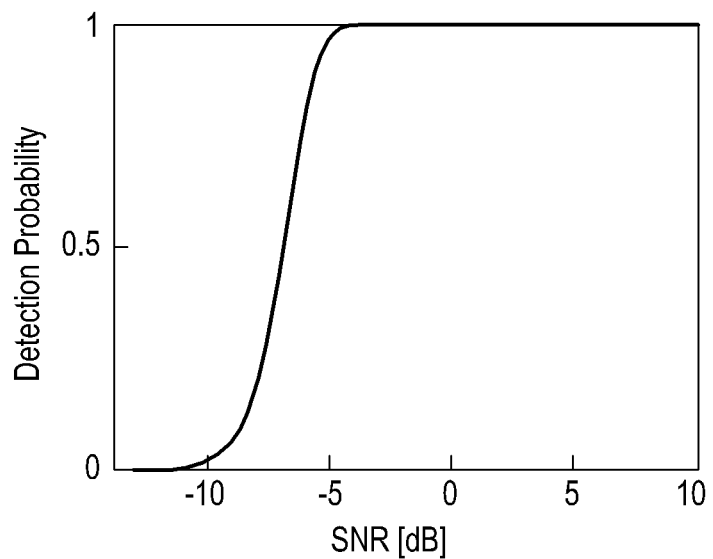
FIGS. 3A, 3B, 4A and 4B show a probability of detecting a PPDU and a probability of missing a PPDU with respect to a sensitivity of a signal received by a reception entity of a communication system to which the present disclosure is applied.
Figure 3B:
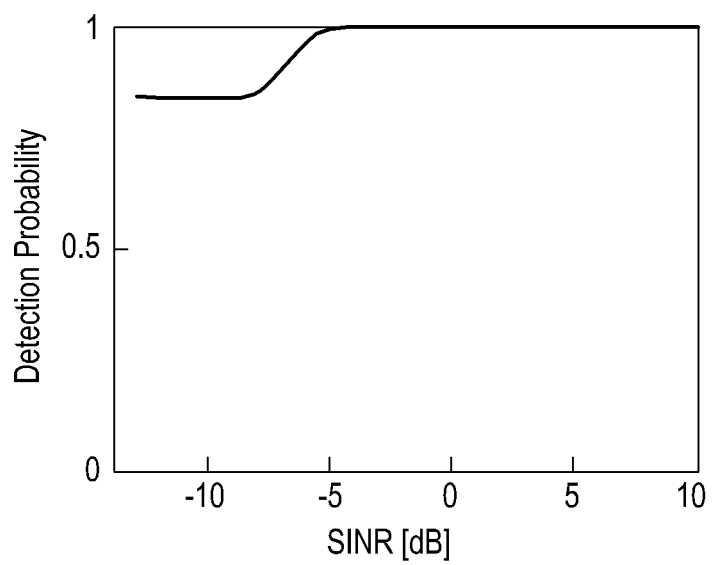

Referring to FIGS. 3A and 3B, when compared to a case shown in FIG. 3A where the reception entity receives only a serving signal from the transmission entity existing in the serving cell, unnecessary PPDU detection is performed at an SINR of −10 dB or below in a case shown in FIG. 3B where the serving signal and an interference signal from a transmission entity existing in at least one neighboring cells are received at the same time.

Figure 4A:
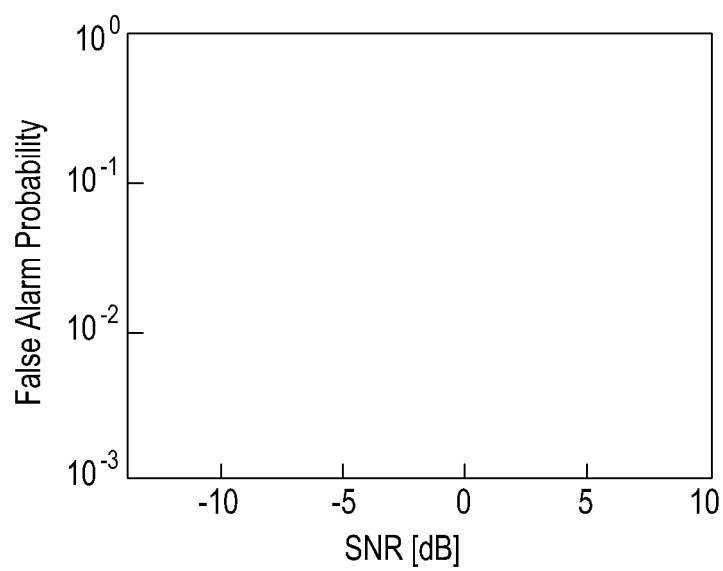
Figure 4B:
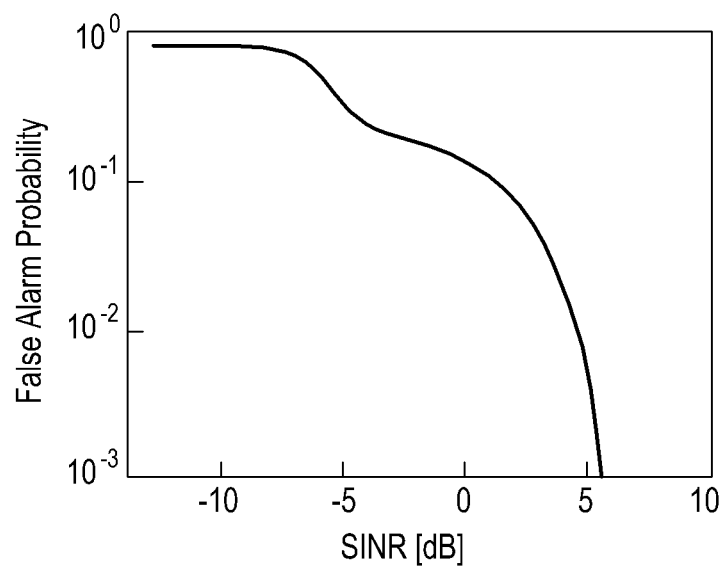

Referring to FIGS. 4A and 3B, when compared to a case shown in FIG. 4A where the reception entity receives only a serving signal, a false alarm of 0.1% or more is generated at an SINR of 5 dB or below in a case shown in FIG. 4B where the reception entity simultaneously receives the serving signal and the interference signal.

As a result, the reception entity may not accurately detect the PPDU included in the serving signal, failing to decode the serving signal and to distinguish the cells.

Therefore, an embodiment of the present disclosure proposes a scheme for accurately detecting a PPDU included in a serving signal and efficiently performing decoding with respect to the serving signal and cell search by the reception entity. That is, an embodiment of the present disclosure proposes a scheme where the transmission entity configures an STF for allowing the reception entity to accurately detect the PPDU and transmits the STF to the reception entity, and the reception entity then detects the PPDU by using the STF.

To this end, embodiments of the present disclosure provide an apparatus and method for transmitting and receiving a signal in a communication system according to an embodiment of the present disclosure.

Figure 5:
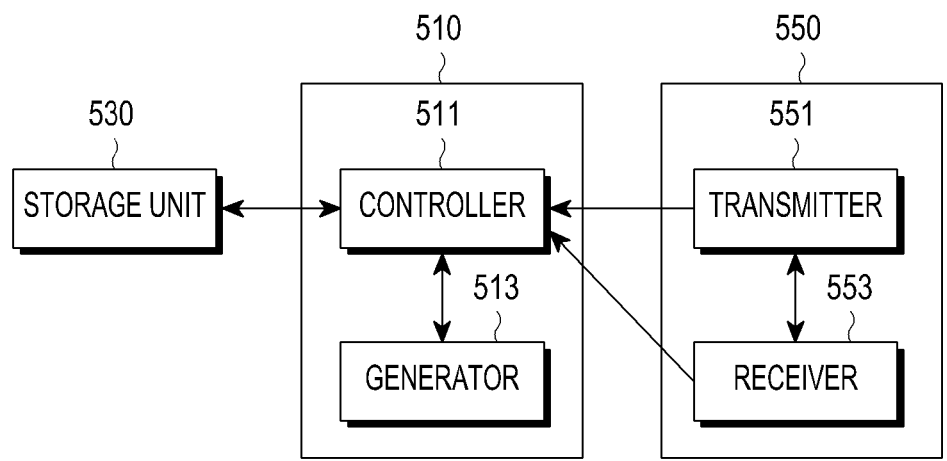
FIG. 5 is a block diagram of a transmission entity in a communication system according to an embodiment of the present disclosure.

FIG. 5 is a block diagram of a transmission entity in a communication system according to an embodiment of the present disclosure.

Referring to FIG. 5, in a communication system according to an embodiment of the present disclosure, a transmission entity includes a control unit 510, a storage unit 530, and a transmission/reception unit 550. The control unit 510 includes a controller 511 and a generator 513. The transmission/reception unit 550 includes a transmitter 551 and a receiver 553.

The control unit 510 controls overall operations of the transmission entity, especially, operations related to configuration of a PPDU in the transmission entity according to an embodiment of the present disclosure. Herein, the control unit 510 can operate in such a way that the controller 511 and the generator 513 operate separately or as one unit. The controller 511 controls the generator 513 to generate sequences of each field included in the PPDU. In particular, the controller 511 controls the generator 513 to generate a Golay sequence for improving the performance of detecting a PPDU included in a serving signal received from the transmission entity existing in the serving cell when the reception entity receives the plurality of signals.

The generator 513 generates the Golay sequence by using a recursive procedure of Equation 1 under control of the controller 511. Herein, the Golay sequence is generally configured as a pair.

$$A_0(k) = \delta(k) \qquad (1)$$
$$B_0(k) = \delta(k)$$
$$A_n(k) = W_n A_{n-1}(k) + B_{n-1}(k - D_n)$$
$$B_n(k) = W_n A_{n-1}(k) + B_{n-1}(k - D_n),$$

where n=1, 2, ..., N indicates an iteration number, k=0, 1, ..., $2^{N-1}$, $D_n$ indicates a delay value of $2^{P_n}$, $P_n$ indicates any permutation of numbers {0, 1, ..., N−1} with respect to a number {0, 1, ..., N−1}, and $W_n$ indicates an arbitrary weight value (arbitrary complex number of unit magnitude).

Figure 6:
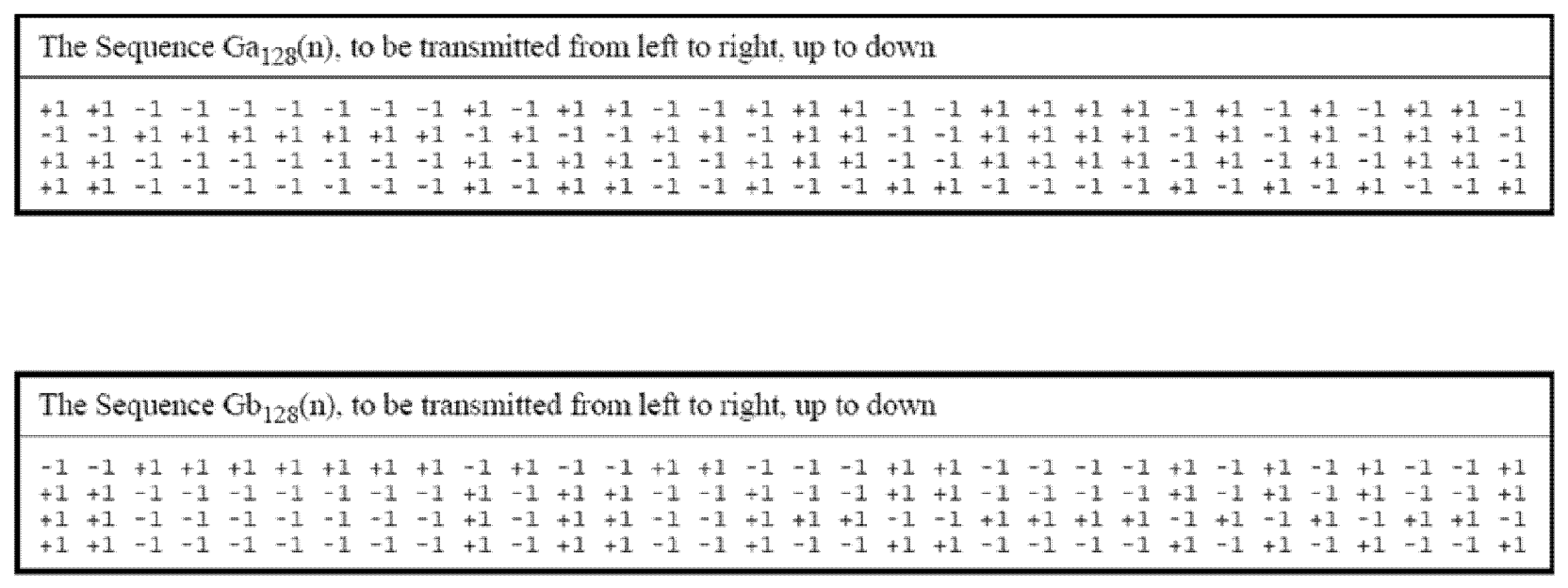

If $D_n$ and $W_n$ are conditioned as expressed in Equation 2 in Equation 1, a pair of Golay sequences as shown in FIG. 6 can be generated. FIG. 6 illustrates a pair of $Ga_{128}(n)$ and $Gb_{128}(n)$, which is a pair of Golay sequences, to which the present disclosure is applied.

$$D_n = [1,8,2,4,16,32,64]$$
$$W_n = [-1,-1,-1,-1,1,-1,-1] \qquad (2).$$

The generator 513 generates a pair of Golay sequences like $Ga_{128}(n)$ and $Gb_{128}(n)$ as many as combinations of $D_n$ and $W_n$ from Equation (1) and Equation (2). That is, the generator 513 generates 5040 Golay sequence pairs with respect to one $W_n$ and 128 Golay sequence pairs with respect to one $D_n$, such that the generator 513 is able to generate a total of 645120 Golay sequence pairs based on 1-bit $W_n$.

However, for application of an embodiment of the present disclosure to a Legacy communication system, it is efficient for the generator 513 to use $D_n$ or $W_n$ of Equation (2) that generates the Golay sequence pair of $Ga_{128}(n)$ and $Gb_{128}(n)$. To allow the reception entity to check auto-correlation of a plurality of Golay sequences by using one correlator, it is efficient for the generator 513 to change $W_n$ while fixing $D_n$ when generating a Golay sequence pair.

Thus, the generator 513 can generate 128 Golay sequence pairs by using $D_n$ of Equation (2) while changing $W_n$. The generator 513 according to an embodiment of the present disclosure can generate Golay sequence pairs expected to have good cross-correlation.

For example, the generator 513 can predict cross-correlation of a Golay sequence pair and generate a Golay sequence of a pair expected to have a higher cross-correlation than a preset threshold value, as described below.

Figure 7:
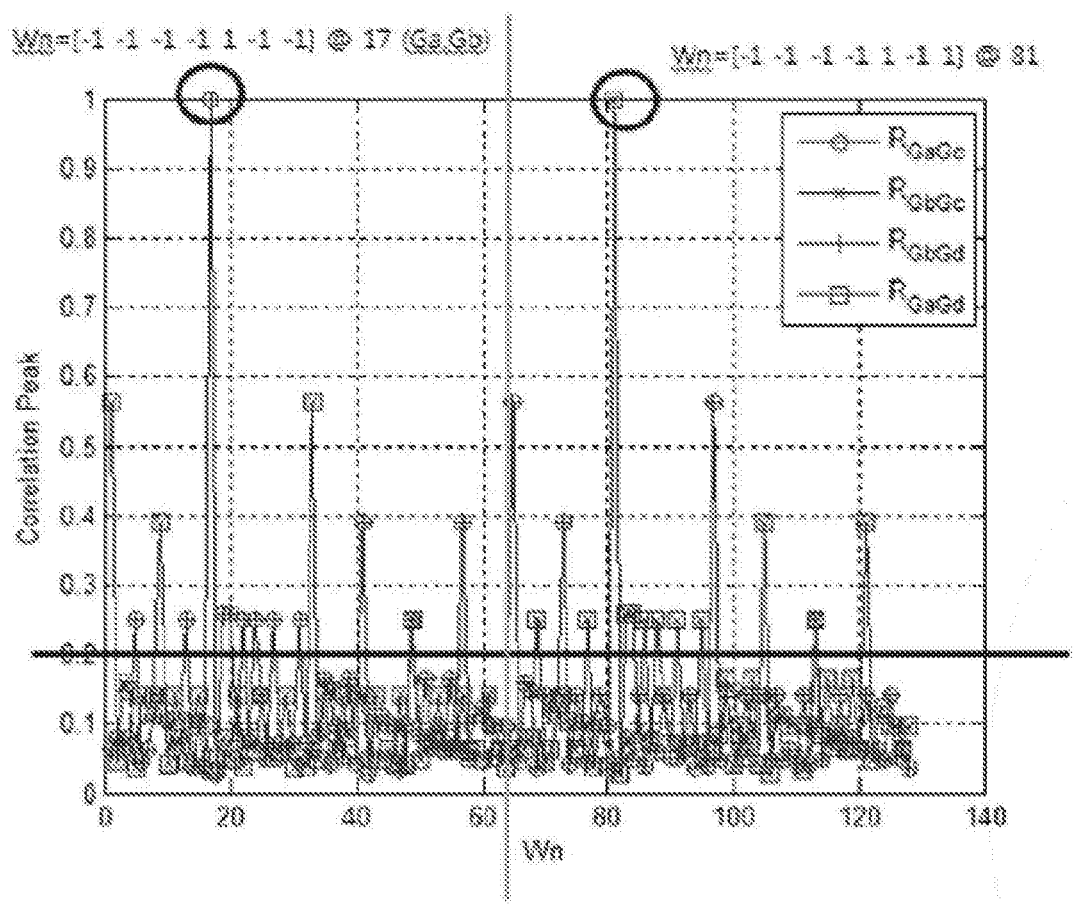
FIG. 7 illustrates correlation characteristics of a pair of Golay sequences applied in an embodiment of the present disclosure.

First, assuming a Golay sequence pair of $Gc_{128}(n)$ and $Gd_{128}(n)$ input to the correlator included in the reception entity, the input $Gc_{128}(n)$ and $Gd_{128(n)}$ can show correlation as shown in FIG. 7.

FIG. 7 illustrates correlation characteristics of a pair of Golay sequences applied in an embodiment of the present disclosure. In FIG. 7, $Gc_{128}(n)$ and $Gd_{128}(n)$ indicate values input to the correlator included in the reception entity, and Rra(k) and Rrb(k) indicate values output from the correlator. In the graph of FIG. 7, a horizontal axis indicates $W_n$ and a vertical axis indicates a correlation peak value.

Referring to FIG. 7, the correlation peak values are $R_{GaGc}$ and $R_{GbGc}$ which are greatest values among output Rra(k) and Rrb(k) when $Gc_{128}(n)$ is applied to the correlator, and are $R_{GaGd}$ and $R_{GbGd}$ Which are greatest values among Rra(k) and Rrb(k) when $Gd_{128}(n)$ is applied. $R_{GaGc}$ and $R_{GbGd}$ have the same correlation peak value, and $R_{GbGc}$ and $R_{GaGd}$ have the same correlation peak value. The correlation peak values $R_{GaGc}$ and $R_{GbGd}$ with respect to $1^{st}$ through $64^{th}$ Golay sequence pairs and the corelation peak values of $R_{GaGd}$ and $R_{GbGc}$ with respect to $65^{th}$ through $128^{th}$ Golay sequence pairs are equal to each other. The $17^{th}$ Golay sequence pair is generated with the same $W_n$ as in Equation (2) and has excellent correlation.

Thus, since a probability of accurately detecting a PPDU for Golay sequence pairs having a correlation peak value of 0.2 or higher is low based on the graph of FIG. 7, the generator 513 can extract Golay sequence pairs having a correlation peak value that is lower than a predetermined threshold value (e.g., 0.2).

That is, the generator 513 extracts Golay sequence pairs that do not have a peak in correlation. The generator 513 also extracts Golay sequence pairs in which a false alarm is not generated from among the extracted Golay sequence pairs. Thus, the Golay sequence pairs extracted by the generator 510 are values in which in terms of correlation measured by the reception entity, a correlation peak value is less than a predetermined threshold value, a false alarm is not generated, and reinforcement/attenuation between Golay sequences do not occur. The Golay sequence pairs extracted by the generator 513 under such a condition have Wn as expressed by Equation (3).

$$W_n^{(1)} = [1, -1, -1, -1, -1, -1, -1] \quad (3)$$
$$W_n^{(2)} = [-1, 1, 1, -1, -1, -1, -1]$$
$$W_n^{(3)} = [1, -1, -1, 1, -1, -1, -1]$$
$$W_n^{(4)} = [1, 1, -1, 1, -1, -1, -1]$$
$$W_n^{(5)} = [1, -1, 1, 1, -1, -1, -1]$$
$$W_n^{(6)} = [1, 1, 1, 1, -1, -1, -1]$$
$$W_n^{(7)} = [1, -1, -1, -1, 1, -1, -1]$$
$$W_n^{(8)} = [-1, 1, 1, -1, 1, -1, -1]$$
$$W_n^{(9)} = [1, -1, -1, 1, 1, -1, -1]$$
$$W_n^{(10)} = [1, 1, -1, 1, 1, -1, -1]$$
$$W_n^{(11)} = [1, -1, 1, 1, 1, -1, -1]$$
$$W_n^{(12)} = [1, 1, 1, 1, 1, -1, -1]$$
$$W_n^{(13)} = [1, -1, -1, -1, -1, 1, -1]$$
$$W_n^{(14)} = [-1, 1, 1, -1, -1, 1, -1]$$
$$W_n^{(15)} = [1, -1, -1, 1, -1, 1, -1]$$
$$W_n^{(16)} = [1, 1, -1, 1, -1, 1, -1]$$
$$W_n^{(17)} = [1, -1, 1, 1, -1, 1, -1]$$
$$W_n^{(18)} = [1, 1, 1, 1, -1, 1, -1]$$
$$W_n^{(19)} = [1, -1, -1, -1, 1, 1, -1]$$
$$W_n^{(20)} = [-1, 1, 1, -1, 1, 1, -1]$$
$$W_n^{(21)} = [1, -1, -1, 1, 1, 1, -1]$$
$$W_n^{(22)} = [1, 1, -1, 1, 1, 1, -1]$$
$$W_n^{(23)} = [1, -1, 1, 1, 1, 1, -1]$$
$$W_n^{(24)} = [1, 1, 1, 1, 1, 1, -1]$$

Thus, the generator 513 according to an embodiment of the present disclosure generates a Golay sequence pair by using one of $W_n$ values defined in Equation (3) and delivers the generated Golay sequence pair to the controller 511. Herein, one $W_n$ can be a preset value among $W_n$ values defined in Equation (3) in such a way that reinforcement/attenuation among Golay sequences do not occur in a plurality of transmission entities.

The controller 511 receives the Golay sequence pair generated by the generator 513, and configures an STF including the generated Golay sequence according to a current situtation. For example, the controller 511 can configure the STF as shown in FIG. 8 according to the current situation.

FIGS. 8A and 8B illustrate an example for configuring an STF in a transmission entity according to an embodiment of the present disclosure.

Referring to FIGS. 8A and 8B, if the Golay sequence pair generated by the generator 513 is defined as $Ga_{128}^{(i)}(n)$, $Gb_{128}^{(i)}(n)$, the controller 511 can configure an STF (a) or (b) according to a situation. In FIG. 8A, an STF for a control physical layer is configured when a control signal is transmitted, and in FIG. 8B, an STF for a Single Carrier (SC) or a Multi-Carrier (MC) physical layer is configured when data is transmitted. The STF configured like (a) may have a length of 6400 Tc, and the STF configured like (b) may have a length of 2176 Tc. (Tc, 0.57 ns).

The controller 511 controls the transmitter 551 to transmit a PPDU including the configured STF to the reception entity. Herein, the STF configured according to an embodiment of the present disclosure can be included in a PPDU as shown in FIG. 9.

FIGS. 9A, 9B and 9C illustrate formats of a PPDU including an STF configured according to an embodiment of the present disclosure.

Referring to FIGS. 9A, 9B and 9C, a Next Generation (NG, 60 GHz)-STF included in the PPDU corresponds to an STF configured according to an embodiment of the present disclosure.

In FIGS. 9A, 9B and 9C, a PPDU format shown in FIG. 9A corresponds to a combination of fields included in a PPDU transmitted by a legacy system and an NG-STF configured according to an embodiment of the present disclosure. When the controller 511 transmits the NG-STF configured according to an embodiment of the present disclosure in the PPDU format shown in (a), inter-system interference can be mitigated. A PPDU format shown in FIG. 9B minimizes overhead. A PPDU format shown in FIG. 9C is a format that is compressed not to transmit data.

Herein, the PPDU formats shown in FIGS. 9A, 9B and 9C can be used in a Multiple Input Multiple Output (MIMO) system.

The storage unit 530 stores programs and various information associated with an operation of configuring a PPDU by the transmission entity under control of the control unit 510 according to an embodiment of the present disclosure.

The receiver 553 receives various signals and various messages from the reception entity under control of the control unit 510.

Meanwhile, the transmission entity is implemented as separate units like the control unit 510, the storage unit 530, and the transmission/reception unit 550 in FIG. 5, but the transmission entity also can be implemented as an integrated form of at least two of the control unit 510, the storage unit 530, and the transmission/reception unit 550. The transmission entity can be implemented with one processor.

Figure 10:
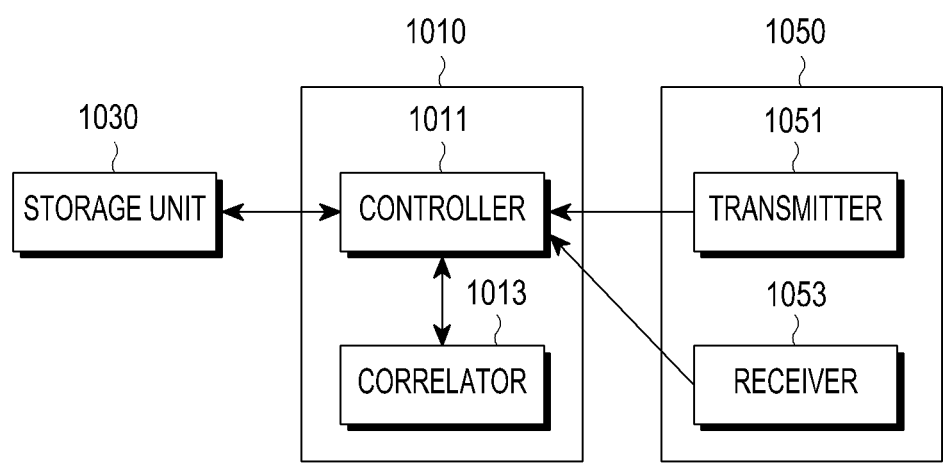
FIG. 10 is a block diagram of a reception entity in a communication system according to an embodiment of the present disclosure.

FIG. 10 is a block diagram of a reception entity in a communication system according to an embodiment of the present disclosure.

Referring to FIG. 10, in a communication system according to an embodiment of the present disclosure, a reception entity can include a control unit 1010, a storage unit 1030, and a transmission/reception unit 1050. The control unit 1010 can include a controller 1011 and a correlator 1013. The transmission/reception unit 1050 can include a transmitter 1051 and a receiver 1053.

The receiver 1053 receives various signals and various messages from the transmission entity under control of the control unit 1010. In particular, the receiver 1050 receives a signal including a PPDU from at least one transmission entity.

The control unit 1010 controls overall operations of the reception entity, especially, an operation of identifying a PPDU included in a signal received from at least one transmission entity by the reception entity according to an embodiment of the present disclosure. Herein, the control unit 1010 can operate in such a way that the controller 1011 and the correlator 1013 operate separately or as one unit. The controller 1011 identifies a PPDU included in a signal received from at least one Transmission entity and delivers the PPDU to the correlator 1013. Herein, an STF provided in a PPDU includes a Golay sequence that has one of $W_n$ values defined by Equation 3 in which a correlation peak value is less than a preset threshold value, a false alarm is not generated, and reinforcement/attenuation with another Golay sequence does not occur.

The controller 1011 receives a plurality of signals from a plurality of transmission entities through the receiver 1051 and controls the Golay sequence included in one STF to be delivered to the correlator 1013 at different points in time through the received signals. In another example, the controller 1011 controls the received signals to be delivered to the correlator 1013 at the same time. In this case the :correlator 1013 may have to include a plurality of correlators (shown in FIG. 11) for processing the received signals, respectively.

The correlator 1013 measures a Correlation with respect to the Golay sequence delivered from the controller 1011 and outputs Rra(k) and Rrb(k). Herein, Rra(k) indicates a correlation value for $Ga_{128}(n)$ and Rrb(k) indicates a correlation value for $Gb_{128}(n)$. The correlator 1013 measures a correlation value for one Golay sequence or simultaneously measures correlation values for a plurality of Golay sequences at the same time, under control of the controller 1011. The correlator 1013 can include a plurality of correlators to measure correlations for the respective plurality of Golay sequences at the same time. For example, the controller 1013 can be configured as shown in FIG. 11.

The controller 1011 knows a .correlator corresponding to the serving cell in advance, and thus the correlator 1013 detects the PPDU of the serving signal based on a correlation value of the corresponding correlator. Additionally, the controller 1011 estimates a delay and a power of a signal for each Golay sequence based on the correlation value measured for each Golay sequence to determine a neighboring cell for performing a handover later.

Figure 11:
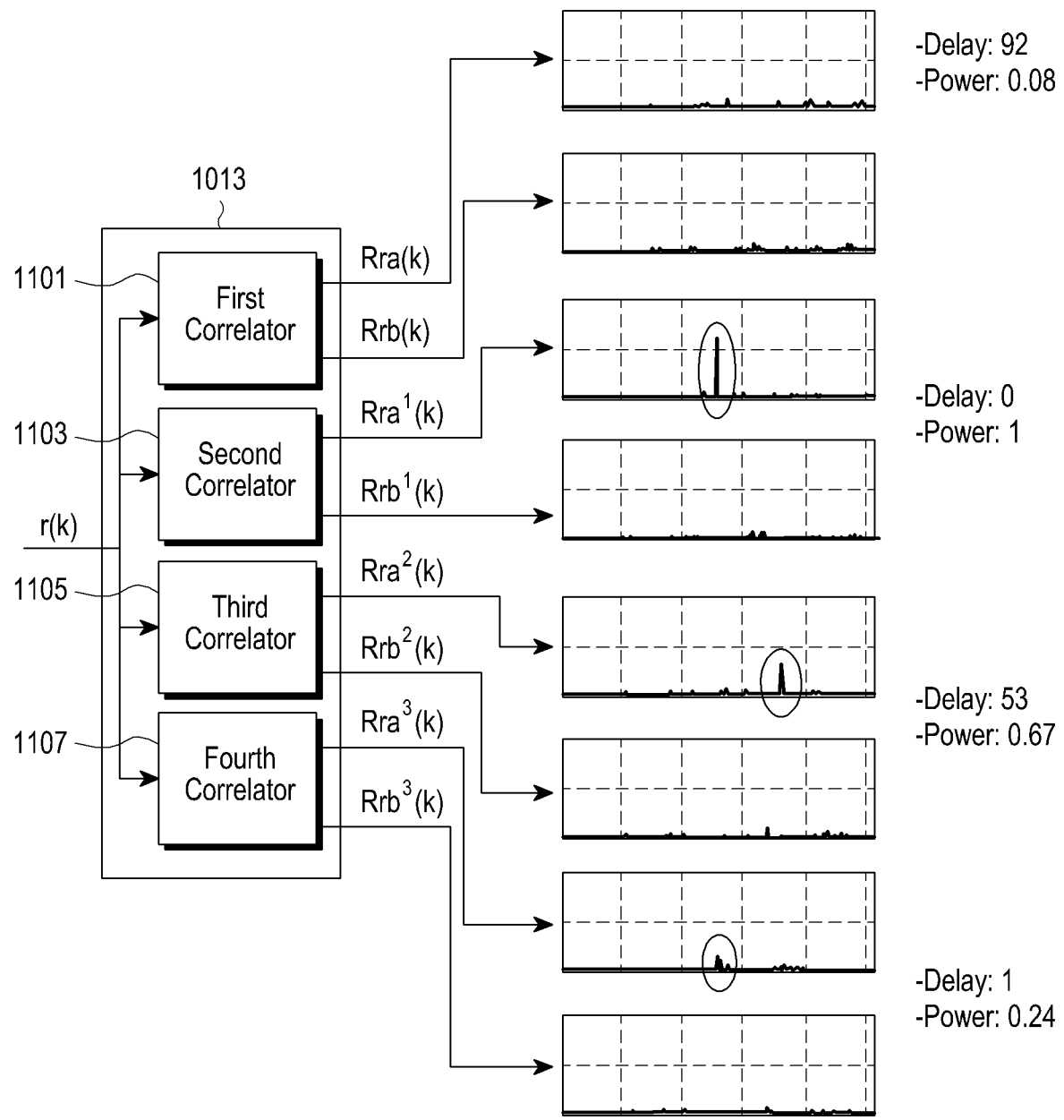
FIG. 11 illustrates an example of a correlator included in a reception entity according to a embodiment of the present disclosure.

FIG. 11 illustrates an example of the correlator 1013 included in the reception entity according to an embodiment of the present disclosure. In FIG. 11, it is assumed that the reception entity receives a signal from a transmission entity existing in four cells, and the serving cell of the reception entity is a cell in which the second transmission entity exists.

Referring to FIG. 11 the correlator 1030 can include first through fourth correlators 1101 through 1107 to simultaneously measure correlation of Golay sequences included in signals received from four transmission entities.

The first correlator 1101 receives a Golay sequence transmitted from a first transmission entity existing in a neighboring cell included in a legacy system .from the controller 1011. The second correlator 1103 receives a Golay sequence transmitted from a transmission entity existing in the serving cell. The third correlator 1105 and the fourth correlator 1107 receive Golay sequences transmitted from transmission entities of neighboring cells using the same communication system as the serving cell. In this case, each of the first through fourth correlators 1101 through 1107 output a correlation peak value as indicated by the output graph shown in FIG. 11 and delivers the correlation peak to the controller 1011.

In certain embodiments, the controller 1011 knows a correlator corresponding to the serving cell in advance and thus detect a PPDU of a serving signal based on a correlation value delivered from the second correlator 1103, and compares correlation peak values delivered from the respective first correlator 1101 through fourth correlator 1107 to identify a neighboring cell to which a handover is to be performed later.

The storage unit 1030 stores programs and various information associated with an operation of detecting a PPDU by the reception entity under control of the control unit 1010 according to an embodiment of the present disclosure.

The transmitter 1051 transmits various signals and various messages to the transmission entity under control of the control unit 1010.

Meanwhile, the reception entity is implemented as separate units like the control unit 1010, the storage unit 1030, and the transmission/reception unit 1050 in FIG. 10, but the transmission entity can also be implemented as an integrated form of at least two of the control unit 1010, the storage unit 1030, and the transmission/reception unit 1050. The reception entity can be implemented with one processor.

Thus, when the reception entity according to an embodiment of the present disclosure detects PPDU using Golay sequences haying one of Wn values defined in Equation 3 from the plurality of transmission entities, the reception entity can indicate a probability of detecting a PPDU and a probability of missing a PPDU.

Figure 12:
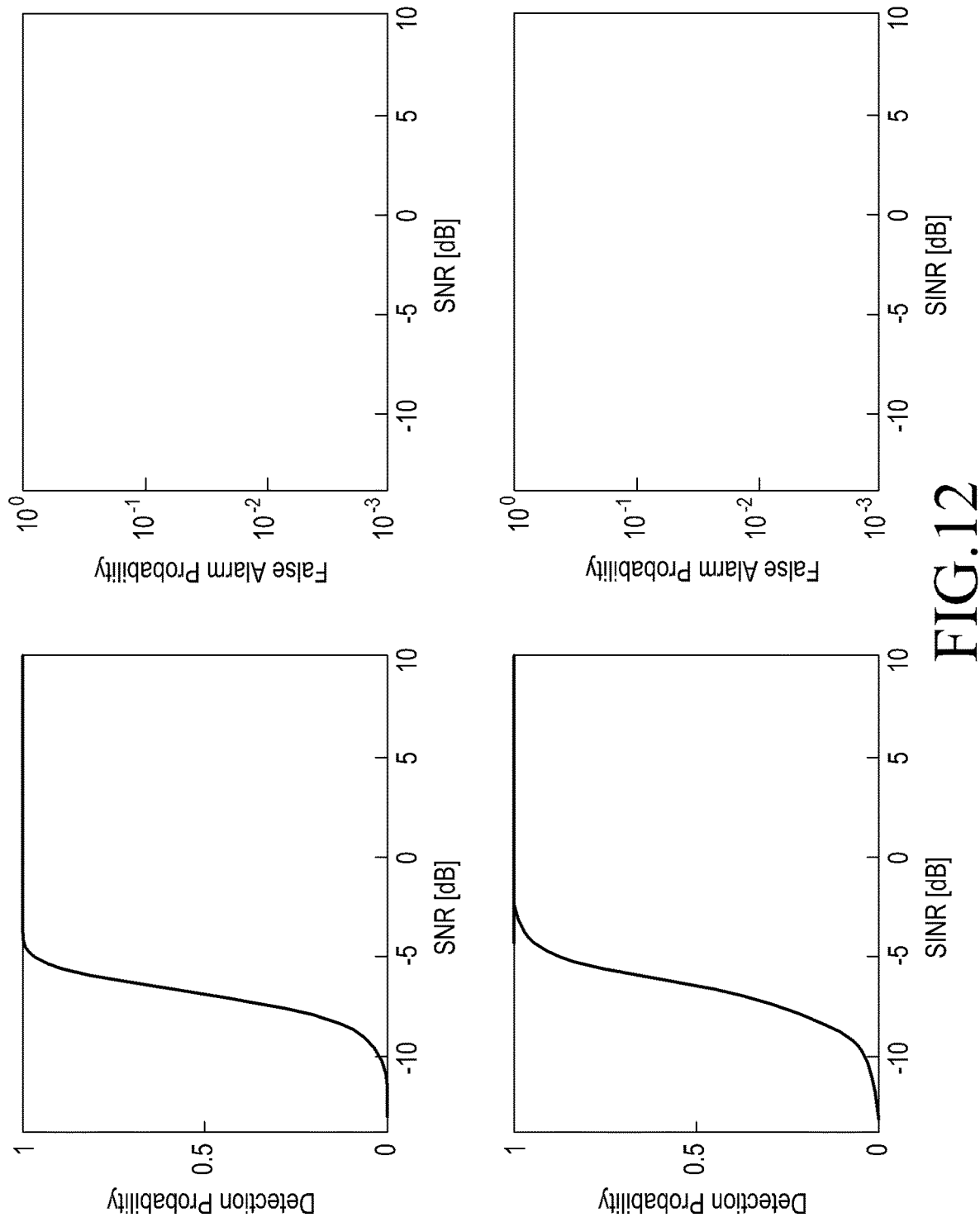
FIG. 12 shows a probability of detecting a PPDU and a probability of missing a PPDU in a reception entity having received Golay sequences generated according to an embodiment of the present disclosure.

FIG. 12 shows a probability of detecting a PPDU and a probability of missing a PPDU in a reception entity having received Golay sequences generated according to an embodiment of the present disclosure.

Referring to FIG. 12, when each of the plurality of transmission entities transmits a signal including a Golay sequence having one of $W_n$ values defined in Equation 3 according to an embodiment of the present disclosure to the reception entity, the reception entity receives the plurality of signals from the respective plurality of transmission entities. However, although receiving the plurality of signals from the respective plurality of transmission entities, the reception entity according to embodiment of the present disclosure can detect a PPDU at a probability that is similar with a case where the reception emits receives only the serving signal as shown in FIGS. 3A, 3B, 4A and 4B.

Figure 13:
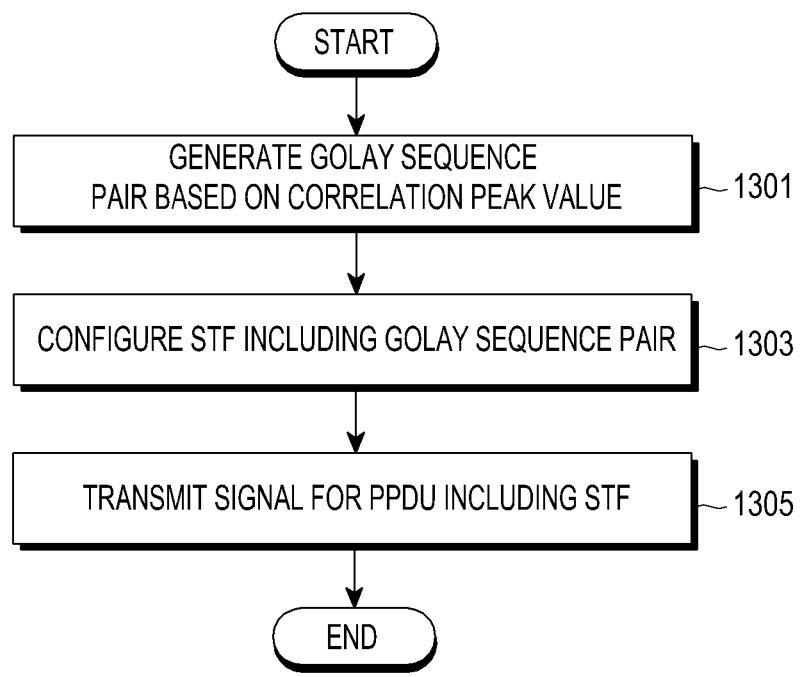
FIG. 13 is a flowchart illustrating a method of transmitting a signal in a transmission entity of a communication system according to an embodiment of the present disclosure.

FIG. 13 is a flowchart illustrating a method of transmitting a signal in a transmission entity it a communication system according to an embodiment of the present disclosure.

Referring to FIG. 13, the transmission entity generates a Golay sequence pair based on a correlation peak value in operation 1301. More specifically, the transmission entity generates a Golay sequence pair with respect to one of weight values defined in Equation (3). The generated Golay sequence pair includes values in which in terms of correlation characteristics measured by the reception entity, a correlation peak value is less than a predetermined threshold value, a false alarm is not generated, and reinforcement/attenuation between Golay sequences do not occur.

The transmission entity configures an STF including the generated Golay sequence pair in operation 1303, and transmits a signal for a PPDU including the STF to the reception entity in operation 1305.

Figure 14:
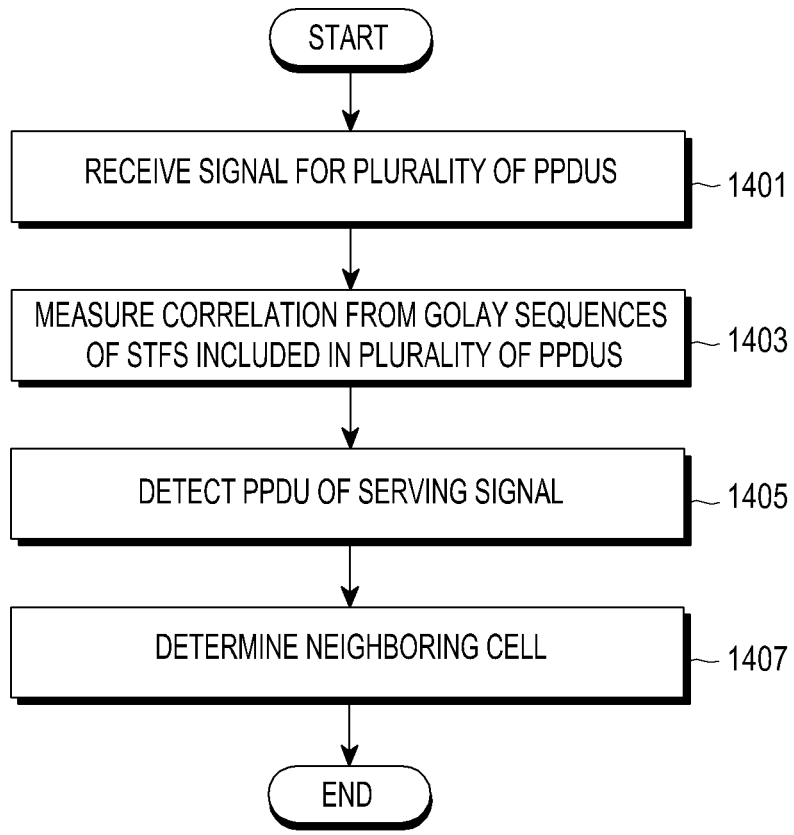
FIG. 14 is a flowchart illustrating a method of receiving a signal in a reception entity of a communication system according to an embodiment of the present disclosure.

FIG. 14 is a flowchart illustrating a method of receiving a signal in a reception entity of a communication system according to an embodiment of the present disclosure.

Referring to FIG. 14, the reception entity receives signals for a plurality of PPDUs from a plurality of transmission entities in operation 1401. The reception entity measures a correlation from Golay sequences of STFs included in the plurality of PPDUs in operation 1403. Herein, each of the Golay sequences has been generated for one of weight values defined in Equation 3. Each of the Golay sequences includes values in which during subsequent correlation measurement, a false alarm is not generated and reinforcement/attenuation is not caused.

The reception entity knows the correlator corresponding to the serving cell in advance and thus detects a PPDU of a serving signal based on a correlation value of the correlator in operation 1405, and compares correlation peak values of the other correlators to determine a neighboring cell capable of performing a handover in operation 1407.

In this way, the reception entity can accurately detect a signal transmitted from a transmission entity existing in a serving cell from among signals received from a plurality of transmission entities and can recognize the signal quality of a neighboring cell.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting a signal by a first transmission entity in a communication system, the method comprising:

obtaining a first golay sequence pair including a first golay sequence and a second golay sequence, among golay sequence pairs generated based on fixed delay values and adjustable weight values of the golay sequence pair, wherein a cross correlation between the first golay sequence pair and at least one second golay sequence pair among the golay sequence pairs is lower than a threshold value;

identifying the first golay sequence included in the obtained first golay sequence pair and generating a first physical layer convergence procedure protocol data unit (PPDU) based on the identified first golay sequence; and transmitting the first PPDU comprising a short training field (STF), wherein the STF comprises the identified first golay sequence, wherein the identified first golay sequence is a sequence which is neither reinforced nor attenuated with the at least one second golay sequence pair used by another transmission entity for transmitting a second PPDU.

2. The method of claim 1, wherein the identified first golay sequence is a sequence in which a false alarm is not identified in terms of correlation characteristics.

3. The method of claim 1, wherein the first golay sequence is identified by:

$$A_0(k) = \delta(k)$$

$$B_0(k) = \delta(k)$$

$$A_n(k) = W_n A_{n-1}(k) + B_{n-1}(k - D_n)$$

$$B_n(k) = W_n A_{n-1}(k) + B_{n-1}(k - D_n),$$

where n=1, 2, ..., N indicates an iteration number, k=0, 1, ..., 2N-1, 2N-1, Dn indicates a delay value of 2Pn, Pn indicates any permutation of numbers {0, 1, ..., N-1} with respect to a number {0, 1, ..., N-1}, Wn indicates a weight value, and the weight value is one of 24 weight values defined by:

$$W_n^{(1)} = [1, -1, -1, -1, -1, -1, -1]$$

$$W_n^{(2)} = [-1, 1, 1, -1, -1, -1, -1]$$

$$W_n^{(3)} = [1, -1, -1, 1, -1, -1, -1]$$

$$W_n^{(4)} = [1, 1, -1, 1, -1, -1, -1]$$

$$W_n^{(5)} = [1, -1, 1, 1, -1, -1, -1]$$

$$W_n^{(6)} = [1, 1, 1, 1, -1, -1, -1]$$

$$W_n^{(7)} = [1, -1, -1, -1, 1, -1, -1]$$

$$W_n^{(8)} = [-1, 1, 1, -1, 1, -1, -1]$$

$$W_n^{(9)} = [1, -1, -1, 1, 1, -1, -1]$$

$$W_n^{(10)} = [1, 1, -1, 1, 1, -1, -1]$$

$$W_n^{(11)} = [1, -1, 1, 1, 1, -1, -1]$$

$$W_n^{(12)} = [1, 1, 1, 1, 1, -1, -1]$$

$$W_n^{(13)} = [1, -1, -1, -1, -1, 1, -1]$$

$$W_n^{(14)} = [-1, 1, 1, -1, -1, 1, -1]$$

$$W_n^{(15)} = [1, -1, -1, 1, -1, 1, -1]$$

$$W_n^{(16)} = [1, 1, -1, 1, -1, 1, -1]$$

$$W_n^{(17)} = [1, -1, 1, 1, -1, 1, -1]$$

$$W_n^{(18)} = [1, 1, 1, 1, -1, 1, -1]$$

$$W_n^{(19)} = [1, -1, -1, -1, 1, 1, -1]$$

-continued $W_n^{(20)} = [-1, 1, 1, -1, 1, 1, -1]$ $W_n^{(21)} = [1, -1, -1, 1, 1, 1, -1]$ $W_n^{(22)} = [1, 1, -1, 1, 1, 1, -1]$ $W_n^{(23)} = [1, -1, 1, 1, 1, 1, -1]$ $W_n^{(24)} = [1, 1, 1, 1, 1, 1, -1]$.

4. The method of claim 1, wherein the first golay sequence is identified by:

$A_0(k) = \delta(k)$ $B_0(k) = \delta(k)$ $A_n(k) = W_n A_{n-1}(k) + B_{n-1}(k - D_n)$ $B_n(k) = W_n A_{n-1}(k) + B_{n-1}(k - D_n)$, where n=1, 2, ..., N indicates an iteration number, k=0, 1, ..., 2N−1, $W_n$ indicates an arbitrary weight value, and $D_n$ indicates a delay value [1,8,2,4,16,32,64].

5. The method of claim 1, wherein the first golay sequence is generated by changing a weight value for each of predetermined delay values.

6. An apparatus for transmitting a signal in a communication system, the apparatus comprising:
a transceiver configured to transmit or receive data;
at least one processor configured to:
obtain a first golay sequence pair including a first golay sequence and a second golay sequence, among golay sequence pairs generated based on fixed delay values and adjustable weight values of the golay sequence pair, wherein a cross correlation between the first golay sequence pair and at least one second golay sequence pair among the golay sequence pairs is lower than a threshold value;
identify the first golay sequence included in the first obtained golay sequence pair and generating a first physical layer convergence procedure protocol data unit (PPDU) based on the identified first golay sequence; and
transmit the first PPDU comprising a short training field (STF), wherein the STF comprises the identified first golay sequence,
wherein the identified first golay sequence is a sequence which is neither reinforced nor attenuated with the at least one second golay sequence pair used by another transmission entity for transmitting a second PPDU.

7. The apparatus of claim 6, wherein the identified first golay sequence is a sequence in which a false alarm is not identified in terms of correlation characteristics.

8. The apparatus of claim 6, wherein the first golay sequence is identified generated by:

$A_0(k) = \delta(k)$ $B_0(k) = \delta(k)$ $A_n(k) = W_n A_{n-1}(k) + B_{n-1}(k - D_n)$ $B_n(k) = W_n A_{n-1}(k) + B_{n-1}(k - D_n)$, where n=1, 2, ..., N indicates an iteration number, k=0, 1, ..., 2N−1, $D_n$ indicates a delay value of 2Pn, Pn indicates any permutation of numbers $\{0, 1, ..., N-1\}$ with respect to a number $\{0, 1, ..., N-1\}$, Wn indicates an weight value, and the weight value is one of 24 weight values defined by:

$W_n^{(1)} = [1, -1, -1, -1, -1, -1, -1]$ $W_n^{(2)} = [-1, 1, 1, -1, -1, -1, -1]$ $W_n^{(3)} = [1, -1, -1, 1, -1, -1, -1]$ $W_n^{(4)} = [1, 1, -1, 1, -1, -1, -1]$ $W_n^{(5)} = [1, -1, 1, 1, -1, -1, -1]$ $W_n^{(6)} = [1, 1, 1, 1, -1, -1, -1]$ $W_n^{(7)} = [1, -1, -1, -1, 1, -1, -1]$ $W_n^{(8)} = [-1, 1, 1, -1, 1, -1, -1]$ $W_n^{(9)} = [1, -1, -1, 1, 1, -1, -1]$ $W_n^{(10)} = [1, 1, -1, 1, 1, -1, -1]$ $W_n^{(11)} = [1, -1, 1, 1, 1, -1, -1]$ $W_n^{(12)} = [1, 1, 1, 1, 1, -1, -1]$ $W_n^{(13)} = [1, -1, -1, -1, -1, 1, -1]$ $W_n^{(14)} = [-1, 1, 1, -1, -1, 1, -1]$ $W_n^{(15)} = [1, -1, -1, 1, -1, 1, -1]$ $W_n^{(16)} = [1, 1, -1, 1, -1, 1, -1]$ $W_n^{(17)} = [1, -1, 1, 1, -1, 1, -1]$ $W_n^{(18)} = [1, 1, 1, 1, -1, 1, -1]$ $W_n^{(19)} = [1, -1, -1, -1, 1, 1, -1]$ $W_n^{(20)} = [-1, 1, 1, -1, 1, 1, -1]$ $W_n^{(21)} = [1, -1, -1, 1, 1, 1, -1]$ $W_n^{(22)} = [1, 1, -1, 1, 1, 1, -1]$ $W_n^{(23)} = [1, -1, 1, 1, 1, 1, -1]$ $W_n^{(24)} = [1, 1, 1, 1, 1, 1, -1]$.

9. The apparatus of claim 6, wherein the first golay sequence is identifiable by:

$A_0(k) = \delta(k)$ $B_0(k) = \delta(k)$ $A_n(k) = W_n A_{n-1}(k) + B_{n-1}(k - D_n)$ $B_n(k) = W_n A_{n-1}(k) + B_{n-1}(k - D_n)$, where n=1, 2, ..., N indicates an iteration number, k=0, 1, ..., 2N−1, Wn indicates an arbitrary weight value, and $D_n$ indicates a delay value [1,8,2,4,16,32,64].

10. The apparatus of claim 6, wherein the first golay sequence is generated by changing a weight value for each of predetermined delay values.

* * * * *